(12) United States Patent
Nath et al.

(10) Patent No.: US 12,287,835 B2
(45) Date of Patent: Apr. 29, 2025

(54) AUTOMATICALLY EXTRACTING KEY-VALUE DATA INCLUDED IN HETEROGENEOUS DOCUMENT TYPES USING GRAPH REPRESENTATION LEARNING

(71) Applicant: Ushur, Inc., Santa Clara, CA (US)

(72) Inventors: Badri Nath, Edison, NJ (US); Vijayendra Mysore Shamanna, Cupertino, CA (US); Yashu Seth, Patna (IN); Ravil Kashyap, Bangalore (IN); Kaushal Kishore Hebbar, Bangalore (IN); Henry Thomas Peter, Mountain House, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 0 days.

(21) Appl. No.: 18/361,687

(22) Filed: Jul. 28, 2023

(65) Prior Publication Data
US 2025/0036690 A1    Jan. 30, 2025

(51) Int. Cl.
*G06F 16/93* (2019.01)
*G06F 16/903* (2019.01)
(Continued)

(52) U.S. Cl.
CPC ........ *G06F 16/93* (2019.01); *G06F 16/90344* (2019.01); *G06F 16/9038* (2019.01); *G06F 16/906* (2019.01); *G06N 3/0455* (2023.01)

(58) Field of Classification Search
CPC ............... G06F 16/93; G06F 16/90344; G06F 16/9038; G06F 16/906; G06N 3/0455
See application file for complete search history.

(56) References Cited

U.S. PATENT DOCUMENTS 10,614,113 B2    4/2020    Peled
10,949,661 B2    3/2021    Bhotika
(Continued)

FOREIGN PATENT DOCUMENTS

CN    106502994 A    3/2017

OTHER PUBLICATIONS

Sunandan et al. "Extraction of (key, value) pairs from unstructured Ads" Copyright 2015, Association for the advancement of Artificial Intelligence.*

(Continued)

*Primary Examiner* — Etienne P Leroux
*Assistant Examiner* — Cindy Nguyen
(74) *Attorney, Agent, or Firm* — LOWENSTEIN SANDLER LLP; Madhumita Datta

(57) ABSTRACT

Systems and methods are disclosed for automatically extracting keys and corresponding values in any type of source document. Extracting desired words from the tokens in any type of document is based on a uniform approach to represent the source document. This uniform representation encodes features of the desired tokens along with the neighborhood information so that values associated with a given key can be extracted. The disclosed technique learns the representation of tokens independent of source document type and the learned representation is then used to determine relationships between multiple tokens. The neighborhood information and position information are used to determine various relationships between keys and values.

20 Claims, 6 Drawing Sheets

(51) Int. Cl.
  *G06F 16/9038*   (2019.01)
  *G06F 16/906*    (2019.01)
  *G06N 3/0455*    (2023.01)

(56) References Cited

U.S. PATENT DOCUMENTS

| | | | |
|---|---|---|---|
| 11,860,950 B2 * | 1/2024 | Wyle | G06V 30/414 |
| 2023/0123711 A1 * | 4/2023 | De Peuter | G06F 40/284 |
| | | | 704/9 |

OTHER PUBLICATIONS

International Search Report and Written Opinion for International Application No. PCT/US2024/039897, mailed Aug. 21, 2024, 12 Pages.

Jacob Devlin et al., "BERT: Pre-training of Deep Bidirectional Transformers for Language Understanding", Proceedings of NAACL-HLT 2019, © 2019 Association for Computational Linguistics, Jun. 2-Jun. 7, 2019, pp. 4171-4186, Minneapolis, Minnesota.

Tom B. Brown et al., "Language Models are Few-Shot Learners", NIPS'20: Proceedings of the 34th International Conference on Neural Information Processing Systems, Dec. 2020, pp. 1877-1901, Article No. 159.

* cited by examiner

AUTOMATICALLY EXTRACTING KEY-VALUE DATA INCLUDED IN HETEROGENEOUS DOCUMENT TYPES USING GRAPH REPRESENTATION LEARNING

TECHNICAL FIELD

The present disclosure generally relates to a universal technique of automatically extracting desired key-value data from any type of document.

BACKGROUND

Feature extraction refers to the process of transforming raw data into characteristic features (often represented numerically) that can be processed while preserving the information in the original data set. It produces better results than applying machine learning directly to raw data. Feature extraction to identify keys and corresponding values (referred to as a key-value pair) in a source document is a useful tool for intelligent document processing and can be pivotal to workflow automation and other applications that accelerate productivity.

However, current solutions in feature extraction in document processing are optimized for certain types of specific documents and/or optimized for smaller segments of those specific documents. For example, one of the traditional extraction methods involve first dividing an entire document into segments, assigning types to each segment, and identifying keys and values within each segment type. U.S. Pat. No. 10,949,661, titled, "Layout-agnostic complex document processing system" described this segment approach as an illustrative example.

There is a need to automate key-value pair extraction across all document types. Present inventors recognize that the spatial relationship harnessed from an entire source document, without the need for segmentation, would be a more versatile technique to identify and extract key-value data, where the technique is applicable to a variety of input sources, which may be textual or image-based documents or messages.

SUMMARY

The following is a simplified summary of the disclosure in order to provide a basic understanding of some aspects of the disclosure. This summary is not an extensive overview of the disclosure. It is intended to neither identify critical elements of the disclosure, nor delineate any scope of the particular implementations of the disclosure or any scope of the claims. Its sole purpose is to present some concepts of the disclosure in a simplified form as a prelude to the more detailed description that is presented later.

The present disclosure involves extracting key-value data that is included in source documents of different types. Note that the word "document" (used interchangeably with the phrase "source document") here is used to broadly encompass any source containing key-value data. Examples of source documents include, but are not limited to, text messages, emails, textual attachments, image attachments, scanned documents (e.g., PDF files), embedded text or image within the body of a bigger document/message, formatted documents (e.g., spreadsheets, Microsoft Word document etc.). The disclosed extraction technique involves encoding the document in a way that allows identification of different types of keys and values. By analyzing the encoded document, the association between keys and corresponding values can be learned, enabling the desired token extraction, the tokens being keywords and values.

Source documents appear in different forms and not all forms present an ease of detecting words that constitute keywords as well as the associated values. The disclosed technique learns a representational embedding for each of the various document types, from which association between keys and values can be inferred.

The present disclosure relates to a system and method for extracting key-value pairs (note that one key may have one value or multiple values associated with it) from a learned underlying representation of each document.

In an aspect of the disclosure, representation is chosen based on the type of document and keys and values are encoded according to available feature encoding present in the document.

In another aspect, keys are associated with features present in the document. For example, in a text document, certain tokens (e.g., keys) can be associated with a part of speech, such as verb or noun. In another example, if the source document is an image, tokens can be associated as a question token. From this extraction, the corresponding values are also associated with features available in the document such as Named Entities (NE), numbers or answers to questions.

In yet another aspect, the relationships between keys and values are learned by training a classifier to detect edges between keys and values. The presence of edges indicates the affinity between the keyword and the value that needs to be extracted.

Another aspect of the of the disclosure enables learning paths from specific edges that indicate enclosing or containment relationship between successive keys that indicate sectional headings. A path in a graphical representation comprises a sequence of edges connecting vertices. This is a useful feature to identify sub-categories of key values that can be found in a document or forms data.

More specifically, a computer-implemented method for extracting key-value pair included in a document is disclosed. The method comprises: determining, by a document classifier, a type of a document that is received as an input; receiving a set of specific keywords desired by a user; representing the document as a plurality of tokens that are spatially distributed in the document; extracting features of each of the tokens based on the determined document type; associating one or more tags with each token, each of the tags encoding respective features of the token; identifying, by a machine-learning technique, keyword tokens and value tokens from the plurality of tokens based on the encoded features; determining respective affinity score between the keyword tokens and the value tokens based on the encoded features; responsive to determining that an affinity score between a keyword token and a value token surpasses a predetermined threshold, defining an edge between said keyword token and said value token to indicate key-value relationship; and, presenting an output that shows the key-value relationship for the set of specific keywords desired by the user.

Additionally, a system for extracting key-value pair included in a document is disclosed, the system comprising: a document classifier that receives the document as input and determines a type of the source document; an information extractor that represents the document as a plurality of tokens that are spatially distributed in the document, and extracts features of each of the tokens based on the determined document type; an annotator module that associates one or more tags with each token, each of the tags encoding respective features of the token; a trained machine-learning module that identifies keyword tokens and value tokens from the plurality of tokens based on the encoded features, wherein a processor in the machine-learning module determines respective affinity score between the keyword tokens and the value tokens based on the encoded features, and responsive to determining that an affinity score between a keyword token and a value token surpasses a predetermined threshold, defines an edge between said keyword token and said value token to indicate key-value relationship; and, an output module that presents an output, showing the key-value relationship for the set of specific keywords desired by a user.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
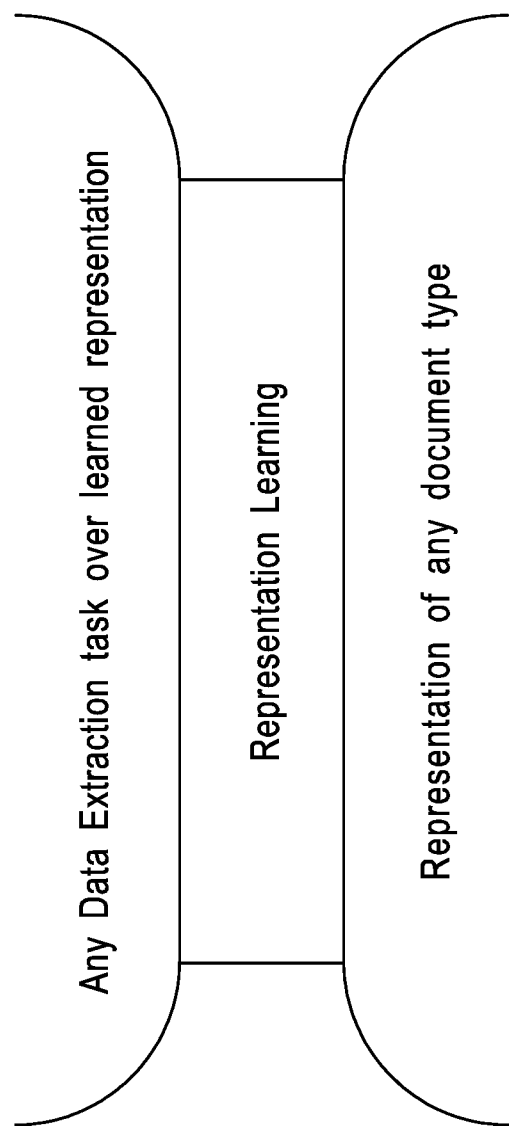
FIG. 1 is an exemplary diagram illustrating the concept of representation learning that is versatile enough to be used with any type of source document, according to an embodiment of the present disclosure.

Embodiments of the present disclosure are directed to automatically extracting relevant information (keys and corresponding values) from various source documents based on representation learning. Since the techniques disclosed here are suited to a variety of document types, sometimes the documents are described as 'heterogeneous documents." Keys and corresponding values are referred to as key-value pair, which is sometimes also described as "key, value(s)." Representation learning is a class of machine learning (ML) approaches that allow a system to automatically discover the representations needed for feature detection of raw data to identify key-value pairs. The source document contains a plurality of tokens. Graph representation learning used in the present disclosure is based on representing the entire source document as a graph (or grid) with spatial coordinates that indicate the position of a token. Keys and values can occur anywhere in the source document, rather than being restricted to smaller units or segments of the source document. The uniform graphical representation scheme disclosed here encodes features of a desired token along with the neighborhood information so that values associated with a given key can be extracted. Once the key-value pairs are identified, they can be used to automate workflow in a number of diverse fields, such as insurance claim processing, medical record analysis, e-commerce etc.

A source document, often simply referred to as a "document," used in the present disclosure broadly encompasses any electronic document, formatted or unformatted, that can be read, tokenized, extracted and modified. The document type can be a standalone document (such as a pure textual email) or can be embedded in other document type, such as a spreadsheet embedded in an email body. A standalone document can also contain attachment of other document type. Similarly, any document can contain an embedded link that can refer to another document. Hence, the term "document" needs to be interpreted broadly to refer to content that can be extracted, such that features can be determined for each token in the document.

Intelligent document processing requires the automated extraction of key-value pairs from documents of various types. Current extraction systems typically use specific methods to identify keys that are assumed to be specified a priori, or rely on keyword searches in searchable documents. However, not all documents are searchable and values may not always appear adjacent to their corresponding keys. To address these challenges, a uniform document representation is needed, along with methods that take into account not only the semantic relationship between keys and values, but also their proximity and neighborhood information. This approach involves tailoring the keyword extraction methodology based on the document type, resulting in a scalable solution to the problem of key-value pair extraction from a heterogenous set of documents.

FIG. 1 is an exemplary diagram illustrating the concept of representation learning that is versatile enough to be used with any type of source document. As illustrated in FIG. 1, a common representation learning is used to determine the relationships between keys and values within a source document. This machine-learning (ML) process is used over any source document type. The representation comprises all features for each token (e.g., text, numerals, punctuation marks) found in the source document. Learning would require encoding features for each source document type received by a document classifier from a user. For example, if the document is a scanned image, the features of the text (such as whether text is bold, what is the font size, etc.) can be learned. Similarly, if the document is a text file (such as, body of an email), then neighborhood information about tokens in the same line or tokens in a line above or below can be inferred by parsing the text file. If the document is a formatted document (such as, a spreadsheet), the metadata in the file can be extracted to obtain cell number, font type and font size of the tokens. Thus, given a source document type, appropriate methods can be used to encode features for every token present in the document. The learned representation stores features listed for each token found in the document.

Figure 2:
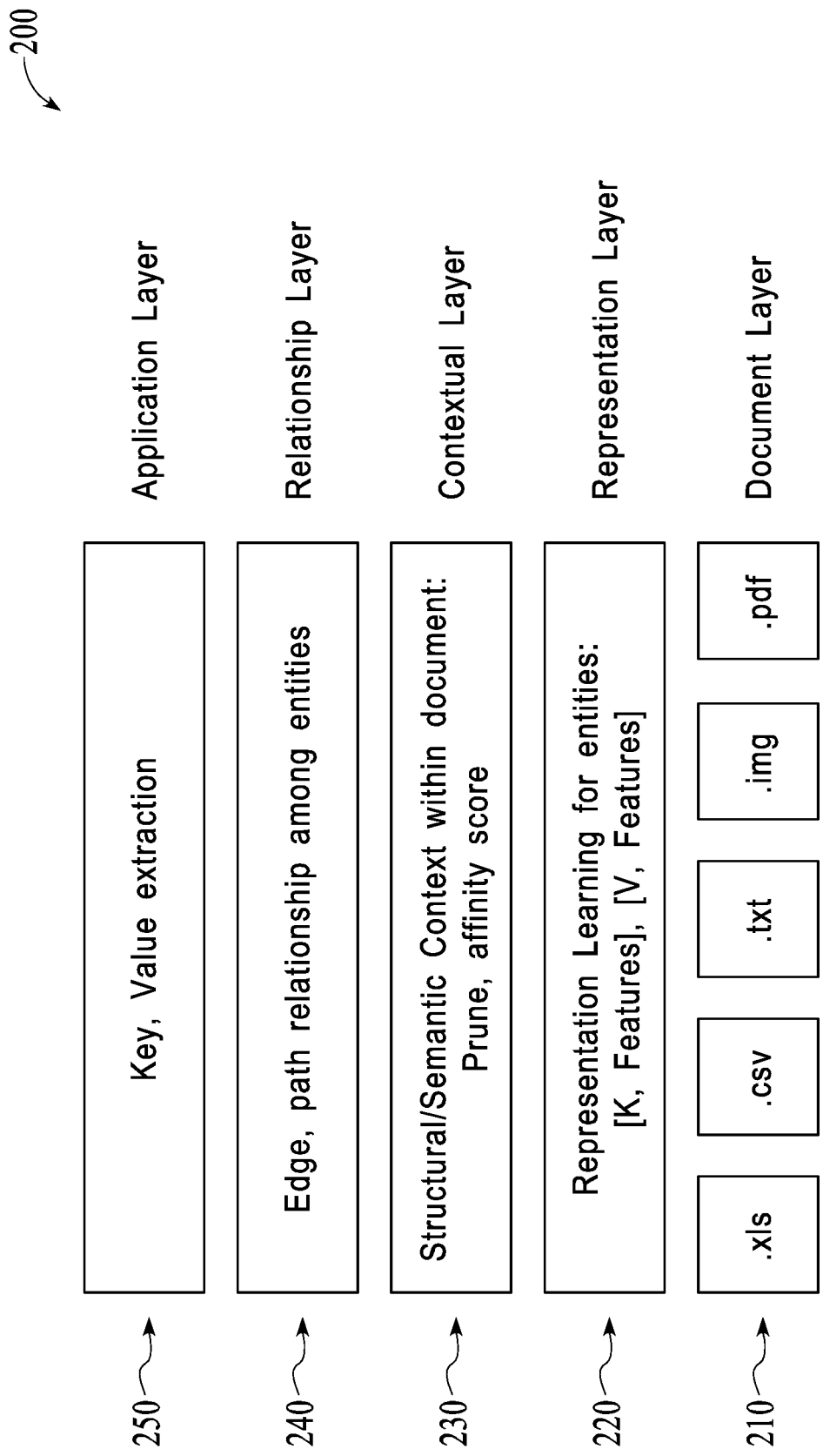
FIG. 2 illustrates a layered architecture used to extract key and value from any type of document, according to an embodiment of the present disclosure.

FIG. 2 is an exemplary diagram of a layered architecture 200 in which systems and methods outlined in the present disclosure may be implemented to extract key, value from any document type. The various layers of the architecture 200 may be implemented in the form of an information extraction component 613 shown in FIG. 6.

Layer 210 is the document layer that is used to detect the type of the document. Examples of types of documents are .xls, .csv, .txt, .img, .pdf etc., though any other type of document can be accommodated. Layer 220 is the representation layer that learns and stores the features for each token present in the document. Some of the tokens are keyword tokens, and some of the tokens are value tokens. [K, Features] indicates stored features of the keywords. [V, Features] indicates stored features of the values. Layer 230 is the contextual layer where the relationship between tokens is inferred. The context can be structural, such as layout information, or, can be semantic context, based on meaning of tokens. Layer 240 is the relationship layer where the association between tokens is learned. The relationship can either be one-to-one between two tokens or one-to-many between one token and a set of tokens. Layer 250 is the application layer which is used by the applications to extract the required key-value pairs as dictated by the application requirements. Each layer is described in greater detail below.

As mentioned above, layer 210 document types are not limited to the one illustrated in FIG. 2 and may encompass any other formatted or unformatted document that can be parsed into tokens. The document type detection function at this layer detects the document type and executes the appropriate feature detector function. The feature detector is a computer program that detects the document type and invokes techniques to obtain features associated with each token. The techniques include image feature detection, metadata extraction, natural language processing of tokens, spatial relationship detection, and the like.

Layer 220 is a processing layer that aggregates all the features for a given token. These features can be gathered by one or more functions. These functions can extract one or more features for each token. In some embodiments, the extraction can be separated based on functionality. For example, a natural language processing function can solely extract all natural language features, such as, part of speech, named entities (NE) including, but not limited to, person, location, money, organization. An image processing function can solely extract image features, such as color, font size, filled shapes (or empty shapes) etc. In some embodiments, a token feature extracted is a question and answer (QA) token obtained from a pre-trained model. Once all the desired functions are invoked, features for a given token form the representation.

Layer 230 is a processing layer where features from different tokens are used to infer the relationship between tokens based on an affinity score. For example, two tokens (e.g., age and the number 60) aligned in a row has a higher affinity score because the likely value for age is a numerical value. At the same time, age and name will have a low affinity score as both are text tokens, and it is expected that age will be associated with a numerical value (textual description of a number, e.g., sixty) rather than a named entity. The affinity score here is based on the expected semantic relationship between tokens. Similarly, a token's affinity score can be based on structural context. For example, the token "Address" and text tokens describing the details of the address can be both to the right of the "Address" token and/or to the right and below it for multi-line address. For example, n FIG. 4, the box checked below the letter M and aligned with the letter M gives a structural context that the gender is M (male). The unchecked box below and aligned with F reinforces the context. Note that layer 230 (or a subsequent layer 240 or 250 described below) may also incorporate a pruning process. Pruning is the process of removing weight connections (in this case edges that may be less critical) in a network to increase inference speed and decrease model storage size.

Figure 4:
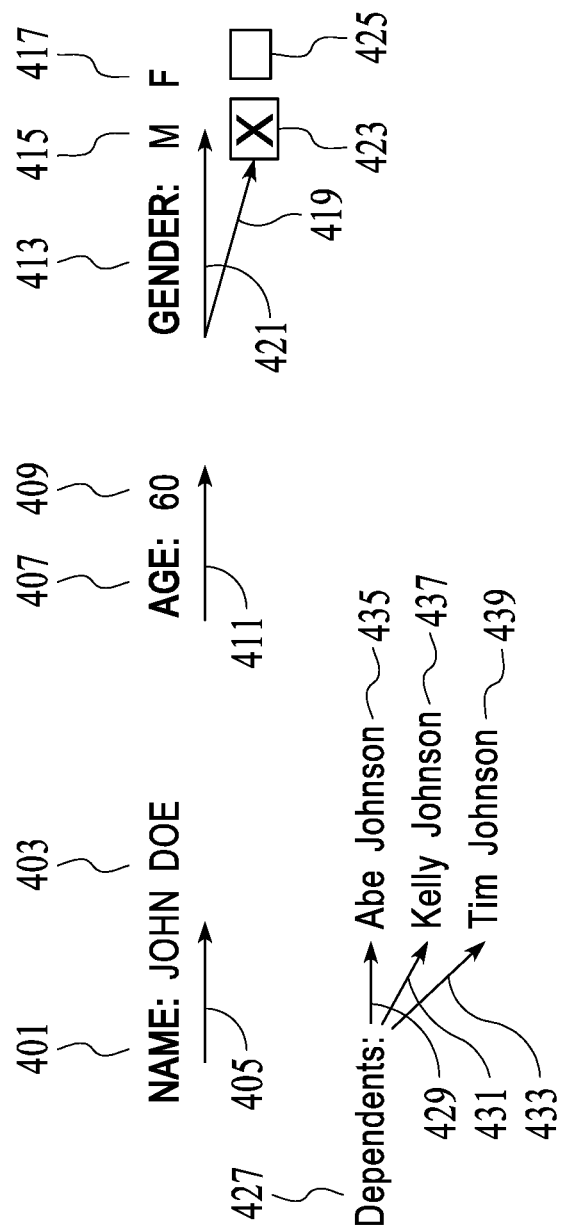
FIG. 4 illustrates a diagram showing how edges represent relationship between tokens, according to an embodiment of the present disclosure.

Layer 240 is the layer where relationships between tokens are represented as edges. In some cases, successive edges are identified to represent a path. The relationship between tokens can be one-to-one (for example, Age and 60) or can be one-to-many (for example, Dependents and names of all the children, as shown in FIG. 4). As described above, affinity scores are calculated between tokens in the contextual layer 230. If the affinity score is above a predetermined threshold, in the layer 240, an edge is added between the two tokens. In the case of one-to-many relationship, multiple edges are added. In some embodiments, the presence or absence of an edge between two tokens can be denoted by a binary flag: such as, 1 to indicate presence of an edge and 0 to indicate the absence of an edge.

Layer 250 is the final application layer which uses an application specific requirement to extract the appropriate key-value pairs. Based on application need, a subset of the tokens and related tokens are provided to the application. For example, an application that requires personal data will only want to extract names and associated information like phone number, address, age etc. In another example, application that requires medical data will only extract tokens that indicate illness or disease and associated dates of treatment. For a specific application, a user may provide desired keywords a priori, and an output module may present kay-value relationship for those desired keywords as required by the application.

Figure 3:
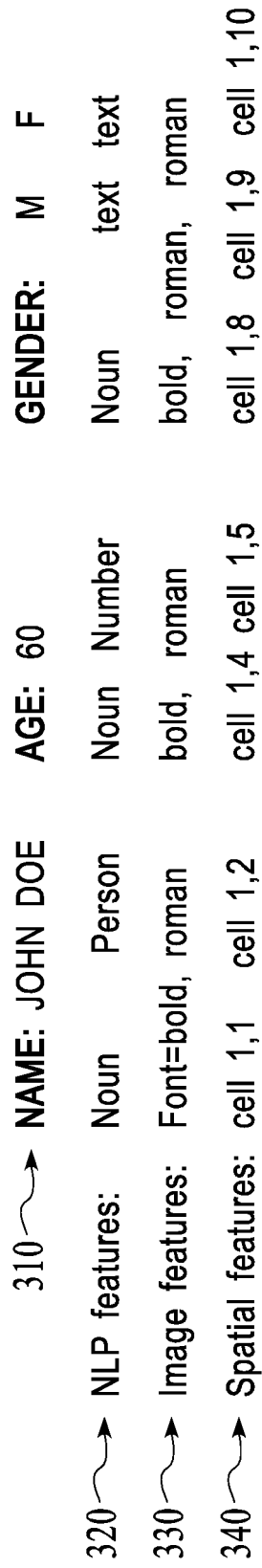
FIG. 3 illustrates function of a feature extraction system, according to an embodiment of the present disclosure.
Figure 6:
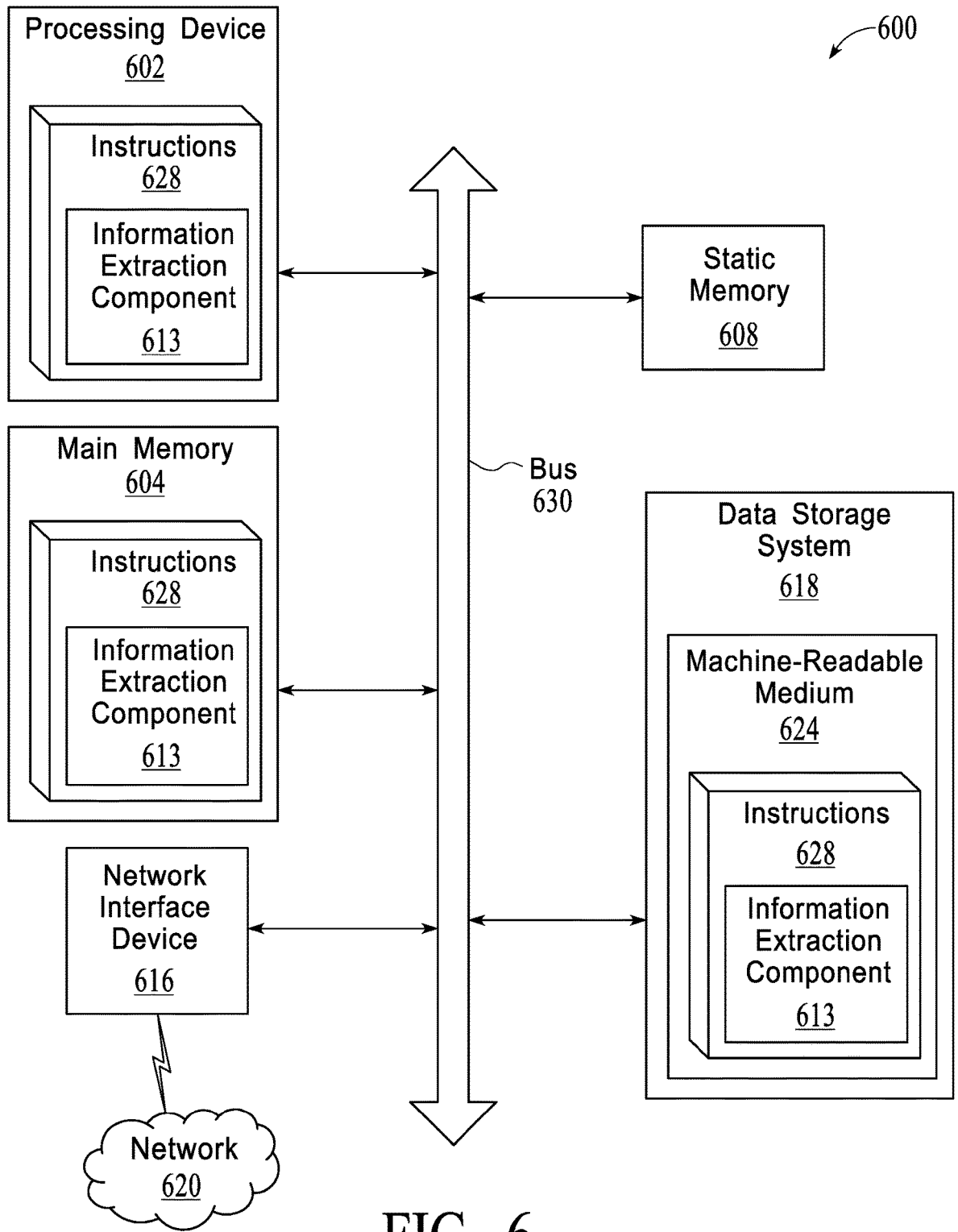
FIG. 6 illustrates an example machine of a computer system within which a set of instructions, for causing the machine to perform any one or more of the methodologies discussed herein, can be executed.

FIG. 3 is an exemplary illustration of feature extraction. Feature extraction can be implemented by one or more software functions executing on a computer system, such as what is shown in FIG. 6. As illustrated in FIG. 3, element 310 indicates a line of text tokens. ("Name: John Doe Age: 60 Gender M F"). This exemplary set of tokens is only for illustrative purposes. A document can contain several lines of tokens, tokens embedded in figures, or tokens embedded in a formatted structured document, such as a table. In one implementation, a feature extractor comprises a natural language processor 320. An annotator module at the output of an NLP processor 320 tags each token with a part of speech (e.g., noun) or a named entity. Image feature detector 330 receives image-based data and can extract (and tag with an annotator module) the tokens with the image features such as, font type, font color, font size, and other image features, like font format (e.g., bold, italics etc.). Other image features, such as status of filled/checked or blank/unchecked of a box (as in elements 423 and 425 in FIG. 4) can also be an extracted image feature. In one implementation, the image features can include bounding boxes (not shown in FIG. 3) to indicate the layout of region of document that contains the token. The dimension of the bounding box can be an extracted image feature. In one implementation, image features can apply to documents, such as a scanned image of a document or any embedded document format. Spatial feature extractor 340 may receive text tokens and from metadata of documents can associate spatial coordinates (e.g., cartesian coordinates) to each token. Here, the document can be viewed as a grid where each cell of the grid can hold a token, even if the document is not formatted into cells. In certain documents such as Excel spreadsheet or Google sheets, every token is associated with a cell identification number (cell id). The cell id is a tuple that contains a row number and a column number. For example, "cell 1,2" means the cell is at row 1, column 2. In one implementation, spatial coordinates can be derived from spacing information in a document. For example, in a text file (such as an email body), the line number can be considered as row number and the position of the token in a numerical sequence along a line can be considered as a column number. The combined features together for a token (NLP features, image features and spatial features) is called the representation of a token in a document.

FIG. 4 is an exemplary diagram showing how edges represent relationship between tokens. Based on the affinity score between tokens, a representation of an edge is stored identifying the relationship. The relationship can be strictly between two tokens indicated by a single edge. In other cases, multiple edges can be stored between one token and several other tokens. Given a key, the values associated with that key can be extracted by following the edges that emanate from the keyword. In the example shown in FIG. 4, there is a single edge 405 between the token 401 (NAME) and token 403 (JOHN DOE). There is a single edge 411 between the token 407 (AGE) and token 409 (60). For the token 413 (GENDER), there are two edges: 421 going to token 415 (M), and edge 419 going to token 423 (graphical element showing of a box that is checked). No edge is placed between token 413 and token 417 (F), or token 413 and token 425 (graphical element showing a box that is not checked) because the calculated affinity score is below a threshold value that is required to warrant placing an edge between tokens. Token 427 (Dependents) is connected to multiple tokens 435, 437 and 439 via respective edges 429, 431 and 433, illustrating one-to-many edge situation (in this example, all of Abe Johnson, Kelly Johnson and Tim Johnson are "Dependents," perhaps as indicated in an insurance form.)

Figure 5:
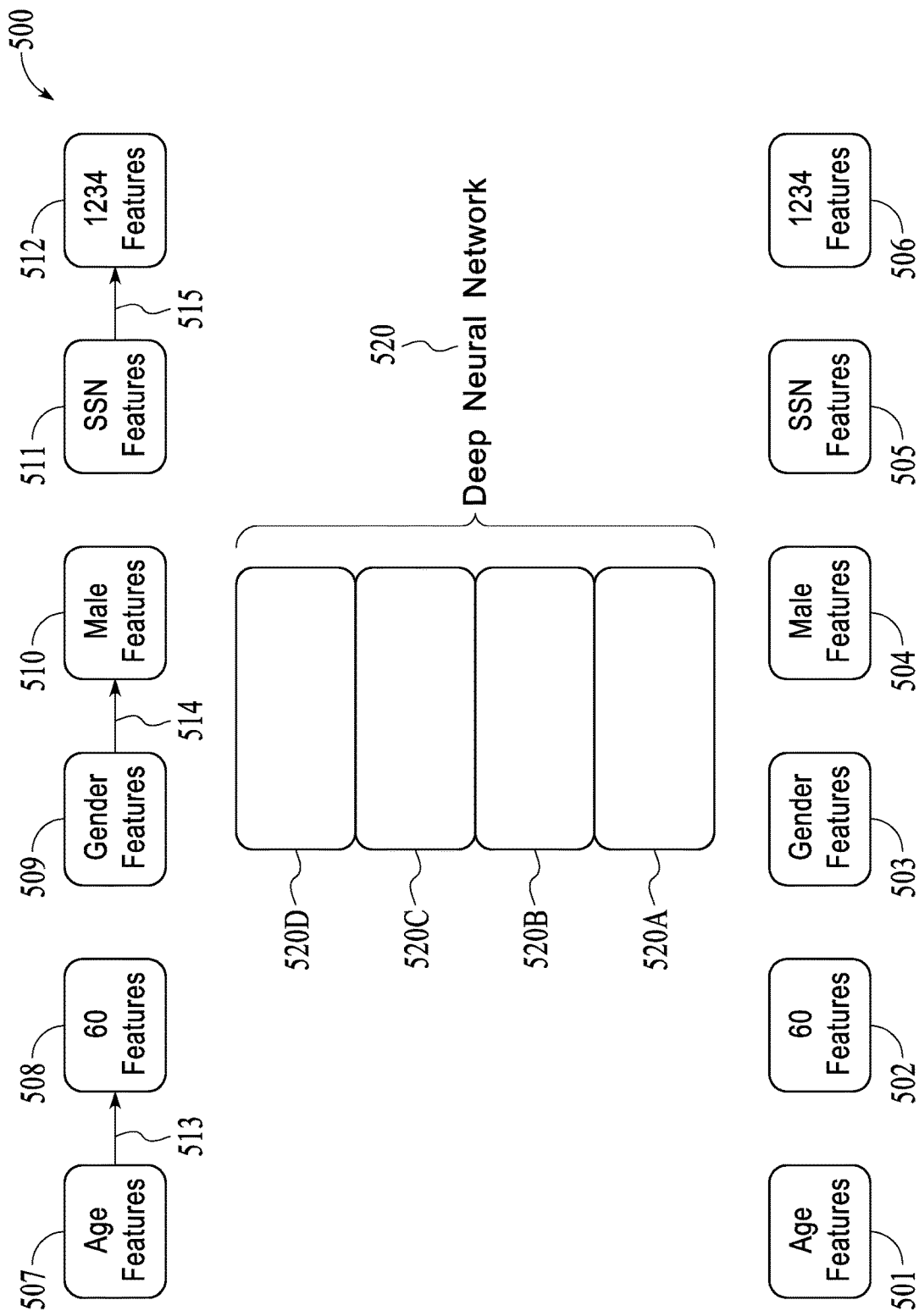
FIG. 5 illustrates a deep neural network architecture to learn the relationship edges between tokens, according to an embodiment of the present disclosure.

FIG. 5 is an illustrative diagram of a deep neural network architecture 500 to learn the relationship edges between tokens. Labeled data is used to train a deep neural network 520 that is then used to predict the presence of edges between tokens. The deep neural network may have multiple layers (e.g., 520A, 520B, 520C and 520D-though four layers are shown here, the network may have fewer or more layers between input layer and output layer). During training, a sequence of tokens along with each of the features as extracted from layer 220 is used as input to the deep neural network 520. For example, token 501 (Age) is fed to the deep neural network 520 along with extracted features. Other tokens 502 (numerical value of age, e.g., 60), 503 (Gender), 504 (e.g., Male), 505 (Social Security Number or SSN), 506 (a sequence of numbers, such as 1234) are also fed to the deep neural network 520. The deep neural network can be any of the known networks, such as Bidirectional Encoder Representations from Transformers (BERT) or Large Language Models (LLM). The label for each pair of tokens indicates the presence or absence of edges. Once the network is trained, the network is used to predict the presence of edges between any pair of tokens extracted from a document. For example, a trained deep neural network would be able to predict presence of edge 513 between token 507 (Age) and token 508 (numerical value of age), and between token 509 (Gender) and 510 (Male), and between token 511 (SSN) and 512 (numerical value of the SSN).

FIG. 6 illustrates an example machine of a computer system 600 within which a set of instructions, for causing the machine to perform any one or more of the methodologies discussed herein, can be executed. In some embodiments, the computer system 600 can correspond to a host system that includes, is coupled to, or utilizes a memory sub-system or can be used to perform the operations of a processor (e.g., to execute an operating system to perform operations corresponding to automatic information extraction, also referred to as information extraction component 613). Note that the information extraction component 613 may have sub-components, for example, document classifier, feature aggregator, QA module, natural language processor, affinity score calculator, application-specific output format module etc. to implement the multi-layer architecture shown in FIG. 2. Specifically, the information extraction component 613 may have the NLP processor 320, image feature detector 330, and spatial feature extractor 340 components shown in FIG. 3. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 608 (e.g., flash memory, static random access memory (SRAM), etc.), and a data storage system 618, which communicate with each other via a bus 630.

Processing device 602 represents one or more processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 628 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 628 or software embodying any one or more of the methodologies or functions described herein. The instructions 628 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to a memory sub-system.

In one embodiment, the instructions 628 include instructions to implement functionality corresponding to the information extraction component 613. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method for extracting key-value pair included in a document, the method comprising:
   determining, by a document classifier, a type of a document that is received as an input;
   receiving a set of specific keywords desired by a user, wherein the user provides the desired keywords a priori;
   representing the document as a plurality of tokens that are spatially distributed in the document;
   extracting features of each of the tokens based on the determined document type;
   associating one or more tags with each token, each of the tags encoding respective features of the token;
   identifying, by a machine-learning technique, keyword tokens and value tokens from the plurality of tokens based on the encoded features;
   determining respective affinity score between the keyword tokens and the value tokens based on the encoded features;
   responsive to determining that an affinity score between a keyword token and a value token surpasses a predetermined threshold, defining an edge between said keyword token and said value token to indicate key-value relationship; and
   presenting an output that shows the key-value relationship for the set of specific keywords desired by the user.

2. The method of claim 1, wherein the extracted features include spatial features containing position information of a particular token as well as position information for other tokens in a neighborhood of the particular token.

3. The method of claim 2, wherein the document is a spatially formatted document, wherein the position information is obtained from metadata.

4. The method of claim 2, wherein the document is represented as a graph, wherein the position information of the particular token is cartesian coordinates on the graph or a cell identification number.

5. The method of claim 2, wherein the document includes text tokens.

6. The method of claim 5, wherein a natural language processor extracts natural language features from the text tokens.

7. The method of claim 6, wherein the natural language features include one or both of a part of speech tag and a named entity tag.

8. The method of claim 2, wherein the document includes image tokens.

9. The method of claim 8, wherein an image feature detector extracts image features from the image tokens.

10. The method of claim 9, wherein the image features include one or more of the following: font type, font size, font format, font color.

11. The method of claim 9, wherein the image features include dimension of bounding boxes around text tokens.

12. The method of claim 2, wherein an extracted feature of a token comprises a question and answer obtained from a pre-trained model.

13. The method of claim 1, wherein determining affinity score includes analyzing semantic context and structural context.

14. The method of claim 1, further comprising:
extracting a path between a plurality of keyword tokens to determine sectional headings.

15. The method of claim 1, wherein the key-value relationship comprises one-to-one relationship indicated by a single edge, or, one-to-many relationship indicated by multiple edges.

16. A system for extracting key-value pair included in a document, the system comprising:
a document classifier that receives the document as input and determines a type of the document;
an information extractor that represents the document as a plurality of tokens that are spatially distributed in the document, and extracts features of each of the tokens based on the determined document type;
an annotator module that associates one or more tags with each token, each of the tags encoding respective features of the token;
a trained machine-learning module that identifies keyword tokens and value tokens from the plurality of tokens based on the encoded features, wherein a processor in the machine-learning module determines respective affinity score between the keyword tokens and the value tokens based on the encoded features, and responsive to determining that an affinity score between a keyword token and a value token surpasses a predetermined threshold, defines an edge between said keyword token and said value token to indicate key-value relationship; and
an output module that presents an output, showing the key-value relationship for a set of specific keywords desired by a user, wherein the user provides the desired keywords a priori.

17. The system of claim 16, wherein the document types include unformatted textual document, unformatted image document, formatted image document, formatted text document, spreadsheet, embedded text or image document, and attached text or image document.

18. The system of claim 16, wherein the information extractor comprises one or more of a natural language processor, an image feature detector, or a spatial feature extractor.

19. The system of claim 16, wherein the machine-learning module learns representation of the document using a deep neural network.

20. The system of claim 19, wherein the deep neural network in BERT or LLM.

* * * * *